US011924527B2

(12) United States Patent
Aluru et al.

(10) Patent No.: US 11,924,527 B2
(45) Date of Patent: Mar. 5, 2024

(54) OPTICAL SENSOR ACTIVATION AND FUSION

(71) Applicant: GM GLOBAL TECHNOLOGY OPERATIONS LLC, Detroit, MI (US)

(72) Inventors: Sai Vishnu Aluru, Commerce Township, MI (US); Brian Yousif-Dickow, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 156 days.

(21) Appl. No.: 17/662,730

(22) Filed: May 10, 2022

(65) Prior Publication Data
US 2023/0370701 A1 Nov. 16, 2023

(51) Int. Cl.
| | |
|---|---|
| *H04N 23/11* | (2023.01) |
| *B60R 11/04* | (2006.01) |
| *B60W 10/00* | (2006.01) |
| *G06V 10/80* | (2022.01) |
| *G06V 20/58* | (2022.01) |

(52) U.S. Cl.
CPC ............ *H04N 23/11* (2023.01); *B60R 11/04* (2013.01); *B60W 10/00* (2013.01); *G06V 10/80* (2022.01); *G06V 20/58* (2022.01); *B60W 2420/42* (2013.01)

(58) Field of Classification Search
CPC ........ H04N 23/11; G06V 20/58; G06V 10/80; B60R 11/04; B60W 2420/42
See application file for complete search history.

(56) References Cited

U.S. PATENT DOCUMENTS

| | | | | |
|---|---|---|---|---|
| 8,098,171 | B1* | 1/2012 | Szczerba | B60Q 9/008 340/905 |
| 8,164,543 | B2* | 4/2012 | Seder | G02B 27/01 340/461 |
| 8,605,947 | B2* | 12/2013 | Zhang | G08G 1/167 348/148 |
| 9,128,290 | B2* | 9/2015 | Kim | G02B 23/12 |
| 10,419,723 | B2* | 9/2019 | Koravadi | H04B 7/0617 |
| 10,468,062 | B1* | 11/2019 | Levinson | G06N 20/00 |
| 10,558,873 | B2* | 2/2020 | Hermalyn | B60R 11/04 |
| 10,740,658 | B2* | 8/2020 | Pollach | G06V 10/803 |
| 10,852,743 | B2* | 12/2020 | Creusot | G08G 1/09623 |
| 10,958,830 | B2* | 3/2021 | Koravadi | H04N 23/56 |
| 11,113,584 | B2* | 9/2021 | Deng | G06V 10/764 |
| 11,218,689 | B2* | 1/2022 | Ye | G06T 7/70 |
| 11,699,250 | B1* | 7/2023 | McCann | G06T 11/00 345/628 |
| 11,815,623 | B2* | 11/2023 | Deng | G01S 7/40 |
| 11,829,128 | B2* | 11/2023 | Hu | G06V 10/993 |

(Continued)

*Primary Examiner* — Brian P Yenke
(74) *Attorney, Agent, or Firm* — Lorenz & Kopf LLP (57) ABSTRACT

An optical sensor system operative for receiving, by a processor, a first image captured by a visible light camera, determining a value of a characteristic of the first image, determining an environmental condition in response to the value being less than a threshold, activating an infrared camera in response to the environmental condition, capturing a second image by the visible light camera and a third image by the infrared camera, generating a fused image in response to the second image and the third image, detecting an object in response to the fused image, and controlling a vehicle in response to the detection of the object.

20 Claims, 5 Drawing Sheets

(56) References Cited

U.S. PATENT DOCUMENTS

| | | | |
|---|---|---|---|
| 2016/0052452 A1* | 2/2016 | Oh | G06F 18/22 |
| | | | 348/148 |
| 2020/0081450 A1* | 3/2020 | Creusot | G08G 1/09623 |
| 2020/0167573 A1* | 5/2020 | Song | G06V 20/56 |
| 2020/0169671 A1* | 5/2020 | Choi | H04N 23/71 |
| 2021/0279846 A1* | 9/2021 | Aluru | G06T 5/40 |
| 2022/0169279 A1* | 6/2022 | Griffin | G06V 20/58 |

* cited by examiner

OPTICAL SENSOR ACTIVATION AND FUSION

BACKGROUND

The present disclosure relates generally to sensor fusion techniques. More specifically, aspects of this disclosure relate to systems, methods and devices to implement a multiple imaging sensor detection algorithm for use in generating area maps used in vehicle control applications.

The operation of modern vehicles is becoming more automated, i.e. able to provide driving control with less and less driver intervention. Vehicle automation has been categorized into numerical levels ranging from zero, corresponding to no automation with full human control, to five, corresponding to full automation with no human control. Various automated driver-assistance systems (ADAS), such as cruise control, adaptive cruise control, and parking assistance systems correspond to lower automation levels, while true "driverless" vehicles correspond to higher automation levels.

Increasingly, vehicles are being equipped with onboard sensors to autonomously determine the environment around them. However, a problem arises in that while some sensors may perform optimally under some environmental conditions, those same sensors may not perform satisfactorily during other weather conditions which may result in a disengagement of an ADAS. For example, vehicle mounted cameras may be blinded from direct lighting of headlights from oncoming traffic and may be very ineffective in extreme low light conditions due to hardware technical constraints of optics/physics. It would be desirable to overcome these disadvantages to improve the optical sensing performance of vehicle mounted cameras and other real time environmental sensing systems and methods.

The above information disclosed in this background section is only for enhancement of understanding of the background of the invention and therefore it may contain information that does not form the prior art that is already known in this country to a person of ordinary skill in the art.

SUMMARY

Disclosed herein are various environmental sensing protocols and related control logic for provisioning vehicle sensor systems, methods for making and methods for operating such systems, and motor vehicles equipped with onboard environmental sensor and control systems. By way of example, and not limitation, there is presented an automobile with visible light cameras, short wave infrared (SWIR) cameras, longwave infrared (LWIR) cameras, light detection and ranging (LiDAR) systems and corresponding processing and control systems.

In accordance with an aspect of the present disclosure, a method including receiving, by a processor, a first image captured by a visible light camera, determining a value of a characteristic of the first image, determining an environmental condition in response to the value being less than a threshold, activating an infrared camera in response to the environmental condition, capturing a second image by the visible light camera and a third image by the infrared camera, generating a fused image in response to the second image and the third image, detecting an object in response to the fused image, and controlling a vehicle in response to the detection of the object.

In accordance with another aspect of the present disclosure, processing the second image to generate a first data and processing the third image to generate a second data and wherein the fused image is generated in response to the first data and the second data.

In accordance with another aspect of the present disclosure, wherein the infrared camera is a shortwave infrared camera.

In accordance with another aspect of the present disclosure, wherein the infrared camera is a long range infrared camera.

In accordance with another aspect of the present disclosure, wherein the environmental condition is further determined in response to a weather condition for a location of a host vehicle.

In accordance with another aspect of the present disclosure, wherein the environmental condition is determined in response to a luminance value of the first image.

In accordance with another aspect of the present disclosure, wherein the environmental condition is determined in response to a loss of object tracking between the first image and a prior image captured by the visible light camera.

In accordance with another aspect of the present disclosure, wherein the environmental condition is determined in response to a plurality of prior images captured by the visible light camera.

In accordance with another aspect of the present disclosure, further including activating a second infrared camera in response to a value of a characteristic of the fused image.

In accordance with another aspect of the present disclosure, an apparatus including a visible light camera for capturing a first image and a second image, an infrared camera for capturing a third image, a processor configured for determining a value of a characteristic of the first image, determining an environmental condition in response to the value being less than a threshold, activating the infrared camera in response to the environmental condition, generating a fused image in response to the second image and the third image, and generating an object data in response to detecting an object in response to the fused image, and a vehicle controller for controlling a host vehicle in response to the object data.

In accordance with another aspect of the present disclosure, wherein the infrared camera includes at least one of a short wave infrared sensor and a long wave infrared sensor.

In accordance with another aspect of the present disclosure, wherein environmental condition is a weather condition at a host vehicle location.

In accordance with another aspect of the present disclosure, wherein the environmental condition is fog.

In accordance with another aspect of the present disclosure, further including predicting a black ice condition in response to the object data and the third image.

In accordance with another aspect of the present disclosure, further including predicting a pool of liquid on a road surface in response to the object data and the third image.

In accordance with another aspect of the present disclosure, further including predicting a presence of organic material in response to the object data and the third image.

In accordance with another aspect of the present disclosure, including a user interface for providing a user alert in response to a hazardous road condition predicted in response to the object data, wherein the hazardous road condition is confirmed in response to the third image.

In accordance with another aspect of the present disclosure, wherein the value of the characteristic of the first image is a number of detected edges within the first image.

In accordance with another aspect of the present disclosure, an optical imaging system including a visible light sensor for generating a first visible light image and a second visible light image, an infrared sensor for generating an infrared light image, a processor for detecting a number of edges within the first visible light image, for activating the infrared sensor in response to the number of edges being below a threshold value, for generating a fused image in response to the second visible light image and the infrared light image, generating an object data in response to detecting an object within the fused image, and a vehicle controller for controlling a vehicle in response to the object data.

In accordance with another aspect of the present disclosure, wherein a field of view of the visible light sensor and a field of view of the infrared sensor are overlapping.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this disclosure, and the manner of attaining them, will become more apparent and the invention will be better understood by reference to the following description of embodiments of the invention taken in conjunction with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Various sensors are used for mapping the proximate environment to host vehicles to enable ADAS algorithms and vehicle control algorithms. However, the performance of each of these sensors may be limited during particular environmental conditions. For example, visible light cameras may be blinded from heavy lighting of headlights from oncoming traffic and may be ineffective in extreme low light conditions due to hardware technical constraints of the optics/physics. It is advantageous to integrate these visible light cameras with smartly integrated SWIR imaging, LWIR/thermal imaging, LiDAR technology, to overcome these limitations such that the object detection and recognition capability of the integrated sensor system is exponentially increased to improve performance of autonomous vehicles. The fusion of the various optical sensors may further increase the capabilities of the ADAS and reduce the occurrences of disengagement of the ADAS system resulting from proactive prediction of conditions such as black ice, natural vegetation, liquids covering the road surface, etc.

Smart integration of visible camera technology, SWIR cameras, LWIR/thermal cameras and LiDAR, whenever performance of the visible camera technology has been degraded, may be used to detect, recognize and predict road hazards to proactively warn customers and improvise vehicle maneuvering. Combining and alternating the usage or fusion of visible/invisible camera technology and LiDAR for efficient usage of on-vehicle energy resources and increased confidence in detection, recognition and prediction may result in an improved understanding of vehicle surroundings for precise, smooth maneuvering and vehicle control. The exemplary system may be configured to detect, recognize, and differentiate black-ice oil/gasoline/diesel spills, broken glass/metal/vehicle parts, and organic objects such as tree leaves and tree branches. In response, the exemplary ADAS may then react safely to the detected conditions and to share this information with other vehicles and/or infrastructure. In some exemplary embodiments, the exemplary system may alternate usage between camera imaging technologies and LiDAR to reduce power consumption. In addition, the ADAS algorithm may switch usage from visible light cameras to best known alternatives, such as SWIR or LWIR, in response to determining adverse weather and/or road conditions.

When the visible camera technology, SWIR cameras, LWIR/thermal cameras and LiDAR are smartly integrated towards a combined or alternating usage the accuracy and confidence rate of object detection and recognition for further classification, training is exponentially increased. Such a system, could improve the applicational usage of autonomous vehicles. Furthermore, autonomous vehicles could be calibrated very efficiently for smooth reactions to surroundings. Their usage and behavior can be trusted in more adverse road conditions/scenarios. In addition, passenger, vulnerable road users, and living object's safety are also exponentially increased. The alternating between technologies help in the reduction of unnecessary usage of other components, thus saving energy for extended battery life.

Figure 1:
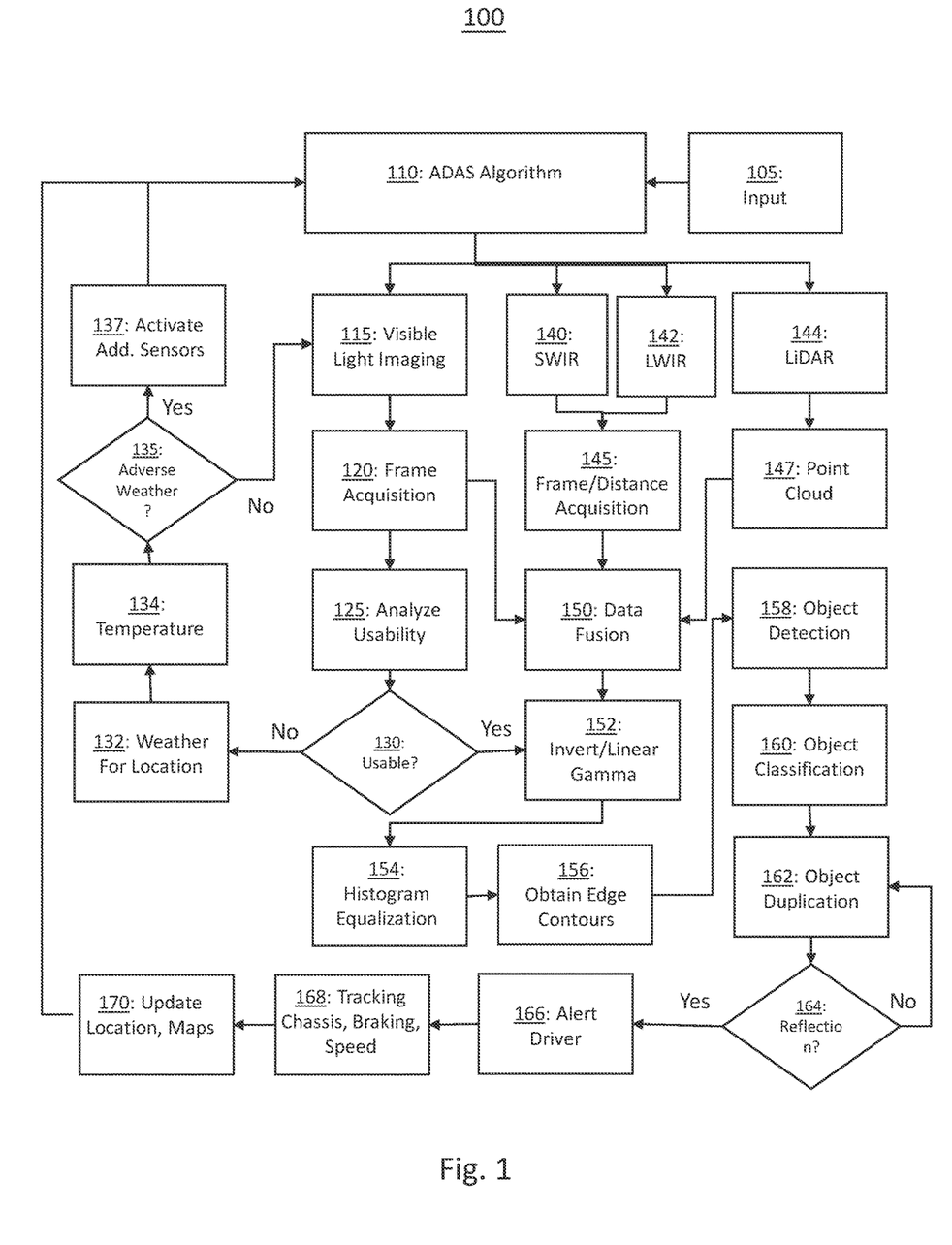
FIG. 1 illustrates an exemplary workflow for implementation of the optical sensor fusion system according to an exemplary embodiment.

Turning now to FIG. 1, an exemplary workflow 100 for implementation of the optical sensor fusion system according to an exemplary embodiment is shown. The exemplary workflow may be initiated in response to an activation of an ADAS vehicle control algorithm 110, such as autonomous vehicle control, adaptive cruise control, automatic emergency braking or the like. The ADAS vehicle control algorithm 110 may be initiated in response to an input 105, such as a user input received via a user interface, or an input generated by another vehicle control system, such as a collision avoidance system, or the like.

The ADAS algorithm 110 may first be configured for requesting sensor data from a visible light imaging sensor 115, such as a vehicle mounted camera or the like. The visible light imaging sensor 115 performs a frame acquisition 120 of the visible light imaging sensor field of view. The frame is next analyzed to determine a usability 125 of the frame. In some exemplary embodiments, the frame may be determined to be usable if the number of detected edges exceeds a predetermined threshold. If the frame is determined to be usable 130, the frame is inverted and a linear gamma correction may be performed on the inverted frame. A histogram equalization 154 is performed and edge contours are obtained 156 on the equalized frame.

Object detection 158 is then performed in response to the edge contours. The detected objects are then classified 160, such as vehicles, pedestrians, trees, etc. Next, a scan is performed on the detected objects to determine if a duplication occurs 162. If a duplication occurs, it is next determined if the duplication occurs due to a reflection 164 from oil, black ice, or an organic material. If it is determined 164 that no black ice or oil spill has caused the object duplication or that an organic object has resulted in a blurred reflection or a blurred object, the workflow returns to further scan 162 for object duplication or blurred reflections. If a reflection or blurred reflection is detected 164, a driver alert is generated 166, vehicle tracking, chassis, braking, and speed data is updated 168. Vehicle location and map data are then updated 170 and the information is provided to the ADAS algorithm 110.

If the captured frame from the visible light imaging sensor is determined 130 to be unusable, the exemplary workflow 100 is next configured to determine 132 a vehicle location and to request weather information for that location. In some exemplary embodiments, the weather location may be determined in response to sensors on the vehicle and/or received via a wireless network. An ambient temperature is determined 134 via sensors coupled to the host vehicle. A time of day may also be determined. If the weather, temperature and/or time of day are indicative of adverse weather, additional sensors, such as SWIR 140, LWIR 142 and/or LiDAR 144 may be activated 137. One or more of the sensor may be activated in response to characteristics of the weather. Data indicative of the activation is then coupled to the ADAS algorithm 110.

In response to activation of one or more of the SWIR 140, LWIR 142, and LiDAR 144, the SWIR 140 and/or LWIR 142 are configured to capture a frame and/or perform distance acquisition on the field of view. The LiDAR may be configured to generate a point cloud 147 of the field of view. In addition, the visible light image sensor 115 may also be configured to capture a frame of the field of view. The frames from each of the visible light sensor 115, the SWIR 140, the LWIR 142 and the point cloud from the LiDAR 144 are then fused to generate a single fused data frame.

The single fused data frame is next inverted and/or a linear gamma correction 152 may be performed on the inverted frame. A histogram equalization 154 is performed and edge contours are obtained 156 on the equalized frame. Object detection 158 is then performed in response to the edge contours. The detected objects are then classified 160, such as vehicles, pedestrians, trees, etc. Next, a scan is performed on the detected objects to determine if a duplication occurs 162. If a duplication occurs, it is next determined if the duplication occurs due to a reflection 164 from oil, black ice, or an organic material. If it is determined 164 that no black ice or oil spill as caused the object duplication or that an organic object has resulted in a blurred reflection or a blurred object, the workflow returns to further scan 162 for object duplication or blurred reflections. If a reflection or blurred reflection is detected 164, a driver alert is generated 166, vehicle tracking, chassis, braking, and speed data is updated 168. Vehicle location and map data are then updated 170 and the information is provided to the ADAS algorithm 110. In some exemplary embodiments, the additional sensors may be deactivated if the frames from the visible light imaging sensor 115 are determined to be usable 130.

Figure 2:
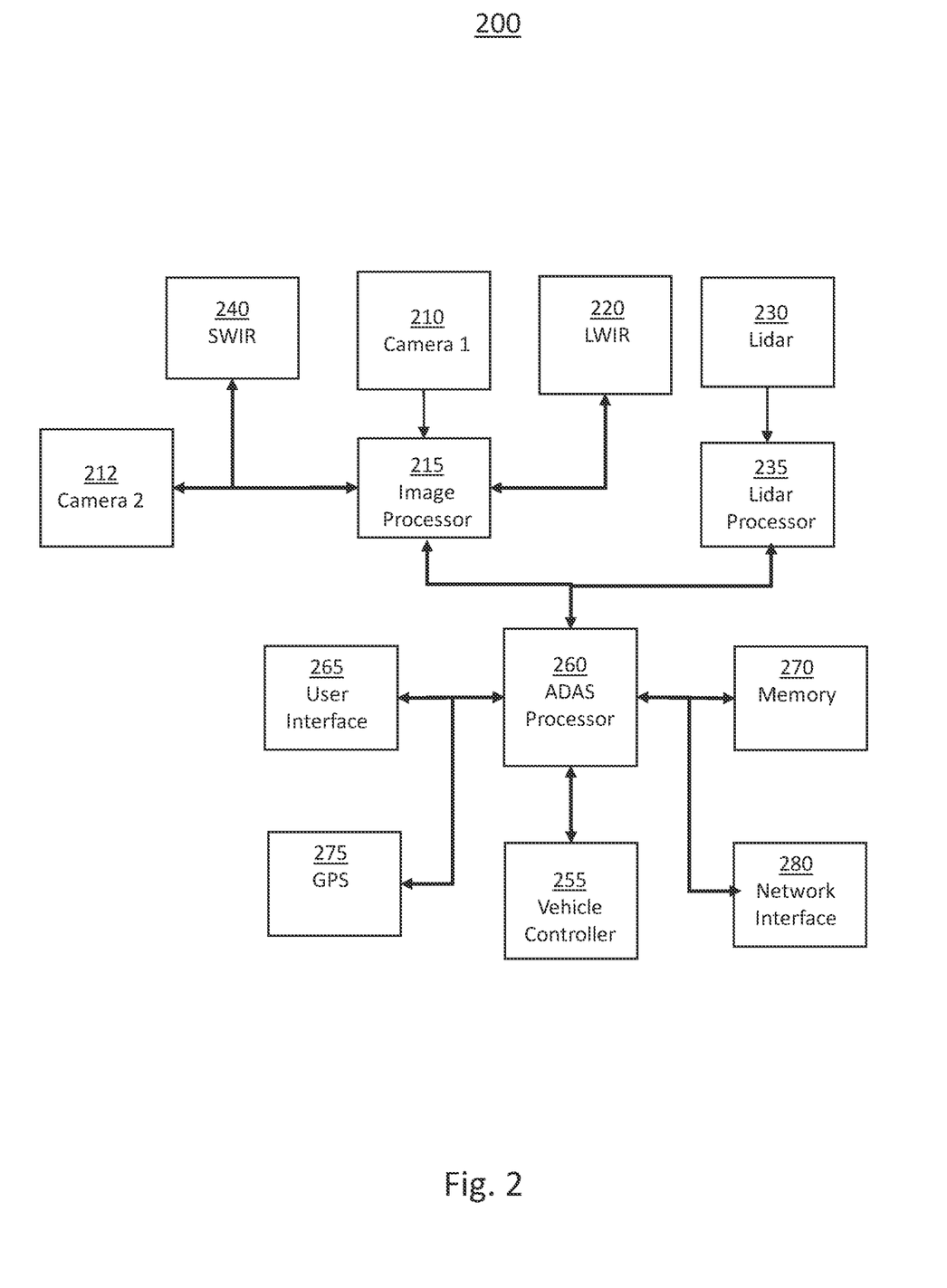
FIG. 2 shows a block diagram illustrating a system for optical sensor fusion according to an exemplary embodiment.

Turning now to FIG. 2, an exemplary system 200 for performing the method for sensor fusion according to an exemplary embodiment is shown. The exemplary system 200 includes a first visible light camera 210, a second visible light camera 212, a LWIR camera 220, a SWIR camera 240, a LiDAR 230, a LiDAR processor 235, an image processor 215, an ADAS processor 260, a user interface 265, and a vehicle controller 255.

The first visible light camera 210 may be mounted on a host vehicle with a forward field of view. The first visible light camera 210 may be mounted to a host vehicle grill, behind a rear view mirror, or on the forward edge of the host vehicle roof. The first visible light camera 210 may be configured to capture an image of the forward field of view and couple this image to the image processor 215. In addition, a second visible light camera 212 may be mounted to one or more side view mirror housings with a second field of view that partially overlaps the forward field of view. In some exemplary embodiments, the image from the first visible light camera 210 and an image captured by the second visible light camera 212 may be combined by the image processor 215 to generate an extended view image including the first field of view and the second field of view. Visible light cameras capture light in the 400 nm to 700 nm spectral range.

The LWIR camera 220 may be configured to capture light in the 8-14 μm spectral band. LWIR cameras are commonly used for thermal imaging, which is the detection of naturally occurring infrared radiation resulting from the conversion of thermal energy into electromagnetic energy. LWIR cameras can be used to detect this infrared radiation through cooler objects making them useful for detecting object, such as pedestrians, obscured through fog, vegetation, low light or high intensity light conditions. The LWIR camera 220 may be configured to have a field of view including the forward field of view and be operative to capture a LWIR image of the forward field of view. The LWIR camera 220 may further be configured to capture an LWIR image of the extended field of view.

The SWIR camera 240 is a camera configured to capture light in the 900 nm to 2500 nm spectral band. SWIR cameras detect reflected light, much like a visible light camera, and can deliver high resolution images unlike the LWIR camera images. SWIR cameras can be used in low lighting conditions to detect objects such as dark and/or camouflaged animals, oils slicks and black ice. The SWIR camera 240 may be configured to have a field of view including the forward field of view and be operative to capture a SWIR image of the forward field of view. The SWIR camera 220 may further be configured to capture an SWIR image of the extended field of view.

The LiDAR 230 is configured to transmit a light pulse at a known azimuth and elevation and to receive a reflection of the light pulse from a distal object. The LiDAR 230 and/or the LiDAR processor 235 may determine a distance to the distal object in response to the propagation time of the light pulse. The LiDAR 230 may couple this distance measurement for the known azimuth and elevation to the LiDAR processor 235 for generation of a point cloud. A point cloud includes distances for a plurality of azimuth and elevation angles to generate a depth representation of the field of view of the LiDAR 230. LiDAR systems typically utilize light in the 750 nm to 1500 nm range. Advantageously, light pulses transmitted by the LiDAR 230 may illuminate the field of view with the reflected light being captured by the SWIR camera 240 images. Thus, in some exemplary embodiments, the SWIR camera 240 performance may be enhanced by the simultaneous use of the LiDAR for the same field of view.

Images captured by the first visible light camera 210, second visible light camera 212, LWIR camera 220, and SWIR camera 240 may be coupled to the image processor 215 for further processing to enable object detection for input to an ADAS algorithm. Further processing may include invert or linearized gamma correction, histogram equalization, and edge detection. In some exemplary embodiments, the image processor 215 may be configured to receive images from two or more of the SWIR camera 240, LWIR camera 220, the first visible light camera 210 and the second visible light camera 212. The image processor 215 may then be configured to combine the data from the plurality of received images into a fused image. The fused image may have an increased dynamic range and/or increased resolution from each of the individual images. The image processor 215 may then perform invert or linearized gamma correction, histogram equalization, and edge detection on the fused image. Object detection and classification may then be performed using the results of the image processing on the fused image and the resulting data coupled to the ADAS processor 260. The object detection on either the fused image or the image from the first visible light camera 210 may be performed using a trained neural network. The results of the object detection may be used to further train the neural network.

The results of this processing and/or the images may be then coupled as an input to the ADAS processor 260. The ADAS processor 260 may use the detected object information, map data stored in a memory 270, location data received in response to a global positioning system (GPS) 275 to generate a localized area map relative to the host vehicle. The ADAS processor 260 may further be operative to generate control signals in response to an ADAS algorithm for coupling to the vehicle controller 255 for controlling the host vehicle. For example, the ADAS algorithm may perform an adaptive cruise control operation and generate steering, braking and throttle control information for coupling to the vehicle controller 255. Alternatively, the ADAS controller may generate a motion path in response to the detected object information and LiDAR point cloud and couple this motion path to the vehicle controller 255.

The user interface 265 may be configured to receive a user input for initiating an ADAS algorithm. In addition, the user interface 265 may be configured to display user alerts, user warnings, and/or ADAS system feedback to a vehicle operation in response to a user alert control signal generated by the ADAS processor 260 and/or the vehicle controller 255.

In some exemplary embodiments, the image processor 215 is first configured to activate the first visible light camera 210 in response to the ADAS algorithm. The image processor 215 may initially deactivate the SWIR camera 240 and the LWIR camera 220 in response to the initiation of the ADAS algorithm. The first visible light camera 210 may then capture a first image of the forward field of view. The image processor 215 may then analyze the first image to determine a usability of the image. If the first image is deemed to be unusable by the image processor 215, the temperature, time of day and/or weather for the current host vehicle location may be retrieved to determine if adverse weather conditions are present around the host vehicle. If adverse weather conditions, or other conditions adverse to capturing a visible light image, such as luminosity saturation of the first image, the image processor 215 may be operative to initiate at least one of the SWIR camera 240 and/or the LWIR camera 220 in response to the adverse weather condition. Images of the forward field of view are then simultaneously captured by each of the first visible light camera 210, the SWIR camera 240 and/or the LWIR camera 220 and data from these images are combined to generate a fused image data. This fused image data is then coupled to the ADAS processor 260 for use by the ADAS vehicle control algorithm.

Figure 3:
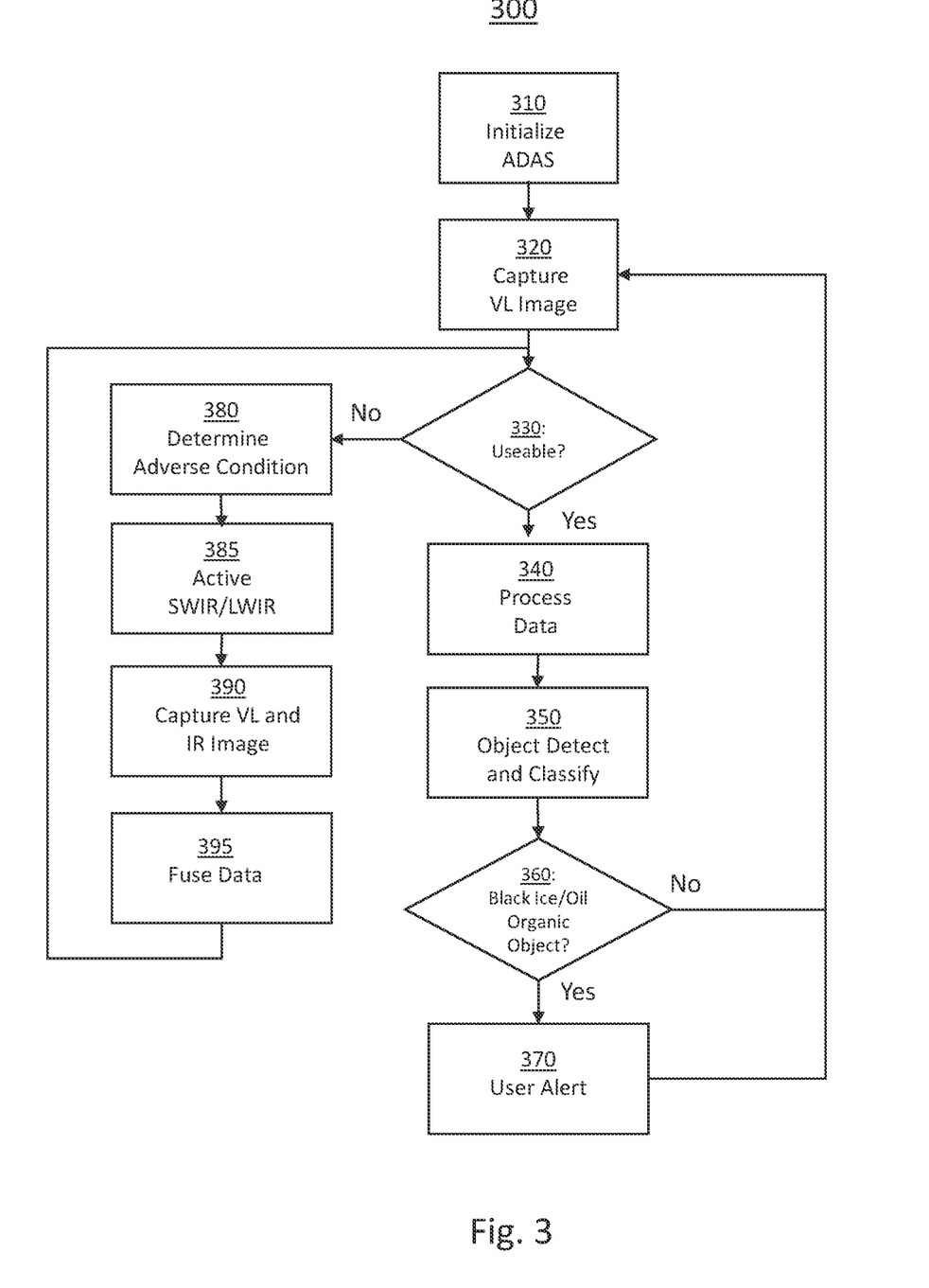
FIG. 3 shows a flow chart illustrating a method for optical sensor fusion according to an exemplary embodiment.

Turning now to FIG. 3, a flow chart illustrating an exemplary implementation of a method 300 for optimized sensor fusion is shown. The method is first operative for initializing 310 an ADAS algorithm. The ADAS algorithm may be initialized in response to a user input, a request or control signal from another ADAS algorithm, or in response to data from a vehicle controller or the like. For example, the ADAS algorithm may be an ADAS safety algorithm, such as emergency braking, which may be initiated in response to vehicle telemetry and/or vehicle sensor data predicting a possible vehicle contact incident.

In response to the initiation of the ADAS algorithm, the exemplary method may next be configured to capture 320 an image of a field of view with a visible light camera. The field of view may be a forward field of view with the visible light camera mounted to the host vehicle. In some exemplary embodiments, the image may be a composite image generated by combining multiple images captured by multiple visible light cameras having overlapping fields of view.

The usability 330 of the image is next evaluated for usability for the ADAS algorithm. Usability may be determined in response to image luminance values, such as low light and saturation conditions, color contrast, and/or image distortion. Loss of information or object detection results when compared to one or more previously received images may also factor in designating an image as unusable.

If the image is determined 330 to be usable, the image is then processed to extract data. Image processing may include invert or linear gamma correction, histogram equalization, and detection of edge contours. Object detection and classification may then be performed 350 on the extracted data. The object classification may be performed using a trained neural network to classify detected objects for use by the ADAS algorithm.

If the image is determined 330 to be unusable, the method is next operative to determine 380 an adverse environmental condition which may be rendering the visible light image unusable. For example, the temperature and weather conditions for the location of the host vehicle may be determined to establish an adverse weather condition. Lighting conditions may be detected for the location of the host vehicle to determine a darkness and/or luminance saturation condition.

One or more additional image sensors are next activated 385 in response to the determination of the adverse environmental condition. For example, for low light conditions, the SWIR camera may be activated. For foggy conditions, the LWIR camera may be activated. If no adverse environmental conditions are detected, or multiple possible adverse environmental conditions are detected, both the SWIR and LWIR cameras may be activated.

Images next are then simultaneously captured 390 by each of the activated cameras. For example, images including the same field of view may be captured by each of the visible light camera, the SWIR camera, and the LWIR camera. Data from these images are then fused 395 to generate a fused image data. The method next determines 330 if the fused image data is suitable for use by the ADAS algorithm. If the image is not suitable, the method again determines 380 an adverse environmental condition in response to the fused data. Additional image sensors 385 may then be activated in response to the newly determined adverse environmental conditions. The image data from each of the activated image sensors is next fused 395 to generate a fused image data and the usability 330 of the fused image data is evaluated.

If the fused image data is evaluated 330 and found to be usable, the data from the fused image is then processed 340 to extract image data. Image processing on the fused image data may include invert or linear gamma correction, histogram equalization, and detection of edge contours. Object detection and classification may then be performed 350 on the extracted data. The object classification may be performed using a trained neural network to classify detected objects for use by the ADAS algorithm.

Black ice, oil and/or organic matter may next be detected 360 in response to the object classification data. Black ice and oil on a road surface may be determined in response to reflections of the same object in the object classification data. For example, if an object is detected and an inverted version of the same object is detected vertically, a reflection of visible light may be occurring from a reflective surface, such as black ice, oil or a pool of water. The method may next use one of the non-visible light images, such as the SWIR image, to detect and characterize the reflective surface.

In response to the detection and classification of the reflective surface, such as black ice, the method next may generate 370 a user alert to notify a vehicle operator of the hazardous condition. In addition, the classification and location of the reflective surface may be combined with the object classification data generated from the visible light and/or fused image data and coupled to the ADAS algorithm. The ADAS algorithm may then generate vehicle control signals to couple to a vehicle controller to control the host vehicle in response to the ADAS algorithm. The method then returns to capture 320 a subsequent visible light image. In some exemplary embodiments, if additional image sensors are activated, they may remain enabled to generate a single fused image data. Alternatively, the additional image sensors may remain enabled for a predetermined number of image processing cycles at which point the usability of a subsequent visible light image may be reevaluated or the additional sensors may remain activated until a deactivation of the ADAS algorithm.

Figure 4:
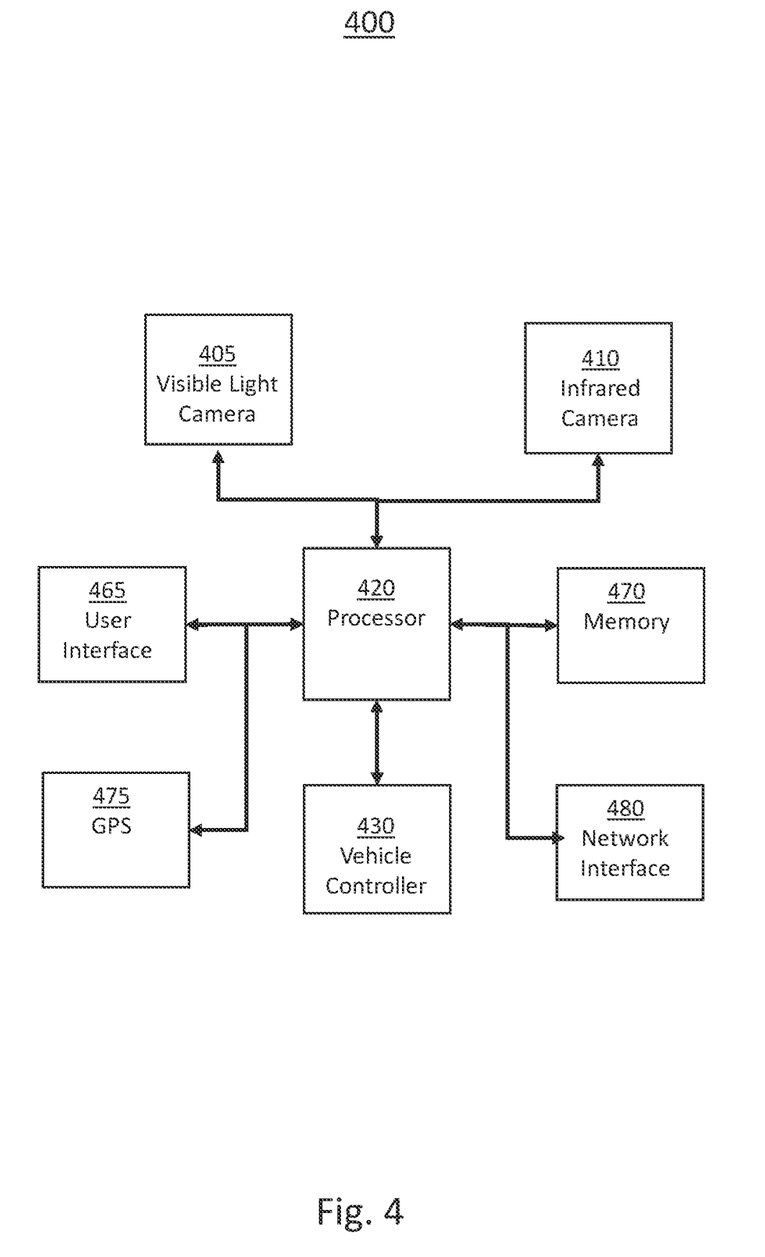
FIG. 4 shows a block diagram illustrating another system for optical sensor fusion according to another exemplary embodiment.

Turning now to FIG. 4, a diagram illustrating an exemplary embodiment of a device 300 for optimized sensor fusion is shown. The exemplary device 400 may include a visible light camera 405, an infrared camera 410, a processor 420, and a vehicle controller 430.

The visible light camera 404 may be configured for capturing a first image and a second image of a field of view. The first image may be captured at a first time and the second image may be captured at a later time. The visible light camera 405 may be a video camera or the like, mounted to a host vehicle for capturing a series of images of a forward looking field of view at various frame rates. In some exemplary embodiments, the visible light camera 405 may include a plurality of visible light sensors, each for capturing a different field of view. The different captured fields of view may be overlapping and images captured by each of the plurality of light sensors may be combined to generate a combined image, such as a panoramic image, birds eye view, or the like.

The infrared camera 410 may be configured for capturing a third image of the field of view. In some exemplary embodiments, the third image may be captured simultaneously with the second image captured by the visible light camera 405. The infrared camera 410 may include a SWIR sensor and/or a LWIR sensor.

The processor 420 may be configured for determining a value of a characteristic of the first image, determining an environmental condition in response to the value being less than a threshold, activating the infrared camera in response to the environmental condition, generating a fused image in response to the second image and the third image, and generating an object data in response to detecting an object in response to the fused image. The environmental condition may be determined in response to a determination of a host vehicle location in response to data from a GPS 475 and/or map data stored in a memory 470. Data related to the environmental condition may be received via a network interface 480, such as a cellular network and/or wireless network interface. In some exemplary embodiments, the environmental condition may be a weather condition at a host vehicle location, such as fog, rain, wind, light diffusion resulting from overhead organic cover or the like. The value of the characteristic of the first image may be a number of detected edges within the first image as detected in response to an edge detection image processing algorithm.

The vehicle controller 430 may be operative for controlling a host vehicle in response to the object data. The object data may be used to generate a motion path by the ADAS algorithm to be used for controlling the host vehicle. The exemplary system may further include a user interface 465 for providing a user alert in response to a hazardous road condition predicted in response to the object data, wherein the hazardous road condition is confirmed in response to the third image.

In some exemplary embodiments, the processor 420 may be further configured for predicting a black ice condition or a pool of liquid condition on a road surface in response to the object data and the third image. For example, the processor 420 may be configured to detect a reflection of an object in the visual light image. The processor 420 may then confirm the black ice and/or pool of liquid condition in response to the infrared image. Likewise, the processor 420 may be configured for determining a presence of organic material in response to the object data and the third image.

In some exemplary embodiments, the exemplary system 400 may be an optical imaging system including a visible light sensor 405 for generating a first visible light image and a second visible light image, an infrared sensor 410 for generating an infrared light image, a processor 420 for detecting a number of edges within the first visible light image, for activating the infrared sensor 410 in response to the number of edges being below a threshold value. The processor 420 may be further configured for generating a fused image in response to the second visible light image and the infrared light image, generating an object data in response to detecting an object within the fused image. The object data may then be coupled to a vehicle controller 430 for controlling the host vehicle in response to the object data. In some exemplary embodiments a field of view of the visible light sensor and a field of view of the infrared sensor are overlapping.

Figure 5:
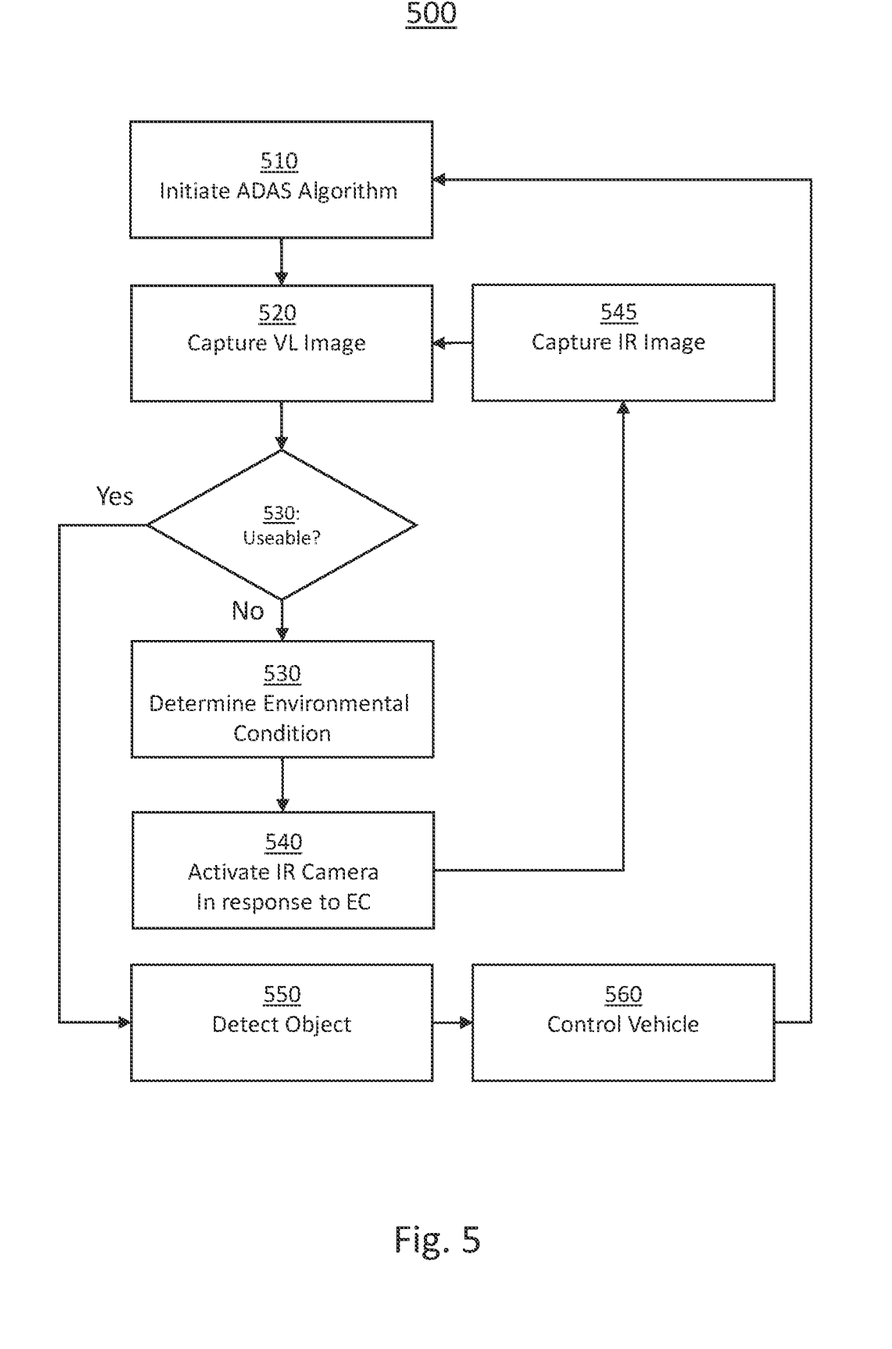
FIG. 5 shows a flow chart illustrating another method for optical sensor fusion according to another exemplary embodiment.

Turning now to FIG. 5, a flow chart illustrating an exemplary implementation of a method 500 for intelligent wireless protocol optimization is shown. The method is first operative for receiving 510, by a processor, a request to initiate an ADAS algorithm. The request may be generated in response to a user input or in response to a vehicle control algorithm, such as a vehicle safety control algorithm or an ADAS algorithm.

The method is next configured to capture 520 a first image captured by a visible light camera. The first image may be a visible light image of a forward facing field of view. The method next determines 530 a usability of the image by determining a value of a characteristic of the first image. In some exemplary embodiments, the value of the characteristic may include a number of edges detected within the first image.

If the value of the characteristic is less than a threshold, the method is next operative for determining 530 an environmental condition in response to the value of the characteristic. The environmental condition is determined in response to a luminance value of the first image, in response to a loss of object tracking between the first image and a prior image captured by the visible light camera, and/or in response to a plurality of prior images captured by the visible light camera.

In response to the environmental condition, the method is next operative for activating 540 an infrared camera in response to the environmental condition. In some exemplary embodiments, the infrared camera is at least one of a shortwave infrared camera and a long wave infrared camera. The method is next operative for capturing 545 a third image with the infrared camera and capturing 520 a second visible light image by the visible light camera. The second image and the third image may be captured simultaneously and may include the same field of view. The method may next generate a fused image in response to the second image and the third image. For example, the method may be configured for processing the second image to generate a first data and processing the third image to generate a second data and wherein the fused image is generated in response to the first data and the second data.

If the fused image is deemed usable 530, the method may next be operative for detecting 550 an object in response to the fused image and controlling 560 a vehicle in response to the detection of the object. If the fused image is not deemed usable, the method may be configured for activating a second infrared camera in response to a value of a characteristic of the fused image being less than a threshold.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   receiving, by a processor, a first image captured by a visible light camera;
   determining a value of a characteristic of the first image;
   determining an environmental condition in response to the value being less than a threshold;
   activating an infrared camera in response to the environmental condition;
   capturing a second image by the visible light camera and a third image by the infrared camera;
   generating a fused image in response to the second image and the third image;
   detecting an object in response to the fused image; and
   controlling a vehicle in response to a detection of the object.

2. The method of claim 1 further including processing the second image to generate a first data and processing the third image to generate a second data and wherein the fused image is generated in response to the first data and the second data.

3. The method of claim 1 wherein the infrared camera is a shortwave infrared camera.

4. The method of claim 1 wherein the infrared camera is a long wave infrared camera.

5. The method of claim 1 wherein the environmental condition is further determined in response to a weather condition for a location of a host vehicle.

6. The method of claim 1 wherein the environmental condition is determined in response to a luminance value of the first image.

7. The method of claim 1 wherein the environmental condition is determined in response to a loss of object tracking between the first image and a prior image captured by the visible light camera.

8. The method of claim 1 wherein the environmental condition is determined in response to a plurality of prior images captured by the visible light camera.

9. The method of claim 1 further including activating a second infrared camera in response to a value of a characteristic of the fused image.

10. An apparatus comprising:
    a visible light camera for capturing a first image and a second image;
    an infrared camera for capturing a third image;
    a processor configured for determining a value of a characteristic of the first image, determining an environmental condition in response to the value being less than a threshold, activating the infrared camera in response to the environmental condition, generating a fused image in response to the second image and the third image, and generating an object data in response to detecting an object in response to the fused image; and
    a vehicle controller for controlling a host vehicle in response to the object data.

11. The apparatus of claim 10 wherein the infrared camera includes at least one of a short wave infrared sensor and a long wave infrared sensor.

12. The apparatus of claim 10 wherein the environmental condition is a weather condition at a host vehicle location.

13. The apparatus of claim 10 wherein the environmental condition is fog.

14. The apparatus of claim 10 further including predicting a black ice condition in response to the object data and the third image.

15. The apparatus of claim 10 further including predicting a pool of liquid on a road surface in response to the object data and the third image.

16. The apparatus of claim 10 predicting a presence of organic material in response to the object data and the third image.

17. The apparatus of claim 10 further including a user interface for providing a user alert in response to a hazardous road condition predicted in response to the object data, wherein the hazardous road condition is confirmed in response to the third image.

18. The apparatus of claim 10 wherein the value of the characteristic of the first image is a number of detected edges within the first image.

19. An optical imaging system comprising:
- a visible light sensor for generating a first visible light image and a second visible light image;
- an infrared sensor for generating an infrared light image;
- a processor for detecting a number of edges within the first visible light image, for activating the infrared sensor in response to the number of edges being below a threshold value, for generating a fused image in response to the second visible light image and the infrared light image, generating an object data in response to detecting an object within the fused image; and
- a vehicle controller for controlling a vehicle in response to the object data.

20. The optical imaging system of claim 19 wherein a field of view of the visible light sensor and a field of view of the infrared sensor are overlapping.

* * * * *